(12) United States Patent
Deniz

(10) Patent No.: US 11,383,635 B1
(45) Date of Patent: Jul. 12, 2022

(54) LIGHTING SYSTEM FOR VEHICLE WHEELS

(71) Applicant: Destiny Deniz, Millstone Township, NJ (US)

(72) Inventor: Destiny Deniz, Millstone Township, NJ (US)

( * ) Notice: Subject to any disclaimer, the term of this patent is extended or adjusted under 35 U.S.C. 154(b) by 198 days.

(21) Appl. No.: 16/807,284

(22) Filed: Mar. 3, 2020

(51) Int. Cl.
| | |
|---|---|
| *B60Q 1/32* | (2006.01) |
| *B60B 7/00* | (2006.01) |
| *B60B 7/06* | (2006.01) |
| *H02J 7/14* | (2006.01) |
| *H02K 7/18* | (2006.01) |
| *B60Q 1/26* | (2006.01) |

(52) U.S. Cl.
CPC ............ *B60Q 1/326* (2013.01); *B60B 7/0013* (2013.01); *B60B 7/068* (2013.01); *H02J 7/1476* (2013.01); *H02K 7/1846* (2013.01); *B60B 2900/571* (2013.01); *B60Q 1/2696* (2013.01); *B60Q 2400/20* (2013.01)

(58) Field of Classification Search
CPC ........ B60Q 1/326; B60Q 1/2696; B60B 7/068
See application file for complete search history.

(56) References Cited

U.S. PATENT DOCUMENTS

| | | | |
|---|---|---|---|
| 6,572,251 B1 | 6/2003 | Huang | |
| 6,765,324 B1* | 7/2004 | Chien | B60Q 1/326 |
| | | | 180/2.2 |
| 7,168,831 B2* | 1/2007 | Cho | B60Q 1/326 |
| | | | 362/500 |
| 2005/0036297 A1* | 2/2005 | Thomas | B60Q 1/326 |
| | | | 362/42 |
| 2006/0044817 A1* | 3/2006 | Terry | B60B 7/006 |
| | | | 362/500 |
| 2006/0209536 A1 | 9/2006 | Bartels | |
| 2007/0002575 A1* | 1/2007 | Chiang | B60Q 1/326 |
| | | | 362/500 |

* cited by examiner

*Primary Examiner* — Julie A Bannan
(74) *Attorney, Agent, or Firm* — Sanchelima & Associates, P.A.; Christian Sanchelima; Jesus Sanchelima

(57) ABSTRACT

A system for vehicle wheels including a hub cap assembly, a bracket assembly and a vehicle assembly is disclosed. The hub cap assembly includes a hub cap that includes lights. The hub cap is mounted to a vehicle to allow a user to customize the vehicle to display different colored lights while driving. The hub cap assembly includes a base mounted underneath of the hub cap. The bracket assembly includes a bracket that is mounted to the wheel hub of the vehicle. The base and hub cap are mounted over the wheel hub and secured to the bracket.

12 Claims, 5 Drawing Sheets

LIGHTING SYSTEM FOR VEHICLE WHEELS

BACKGROUND OF THE INVENTION

1. Field of the Invention

The present invention relates to a lighting system for vehicle wheels and, more particularly, to a lighting system for vehicle wheels that can help illuminate the wheels and the surrounding area while the vehicle is driven, further it allows the driver to improve the aesthetics of their vehicle.

2. Description of the Related Art

Several designs for lighting system for vehicle wheels have been designed in the past. None of them, however, include a vehicle accessory comprising an LED lighting assembly for a vehicle wheel having a hub that fits securely over the center of the rim and incorporates a centrifugal charging generator to maintain battery life, multicolored LEDs, and a wireless remote control. The present invention can be retrofitted onto existing wheels of vehicles to illuminate a surround area. Further, the present invention allows the user to improve the looks or aesthetics of their vehicle.

Applicant believes that a related reference corresponds to U.S. Pat. No. 6,572,251 for a lighting assembly for a vehicle wheel which includes an LED, a centrifugal force switch and a battery cell. Applicant believes that another related reference corresponds to U.S. patent publication No. 2006/0209536 for a lighting assembly which includes a generator assembly which is adapted to be placed within a wheel rim bore of a selectively movable assembly, and which selective power a light emission assembly or display. None of these references, however, teach of a vehicle accessory that incorporates a centrifugal charging generator to maintain battery life, multicolored LEDs, and a wireless remote control.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle wheel accessory that can be retrofitted onto the wheels of existing vehicles.

It is another object of this invention to provide a vehicle wheel accessory that allows a user to improve the looks of their vehicle.

It is still another object of the present invention to provide a wheel accessory that can help to illuminate the surrounding area as the vehicle is driven.

It is also another object of the present invention to provide a wheel accessory that allows customization from the user to allow the user to express their creativity.

It is also another object of the present invention to provide a wheel accessory that can improve the safety of the user by providing added visibility to the user while on the road.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
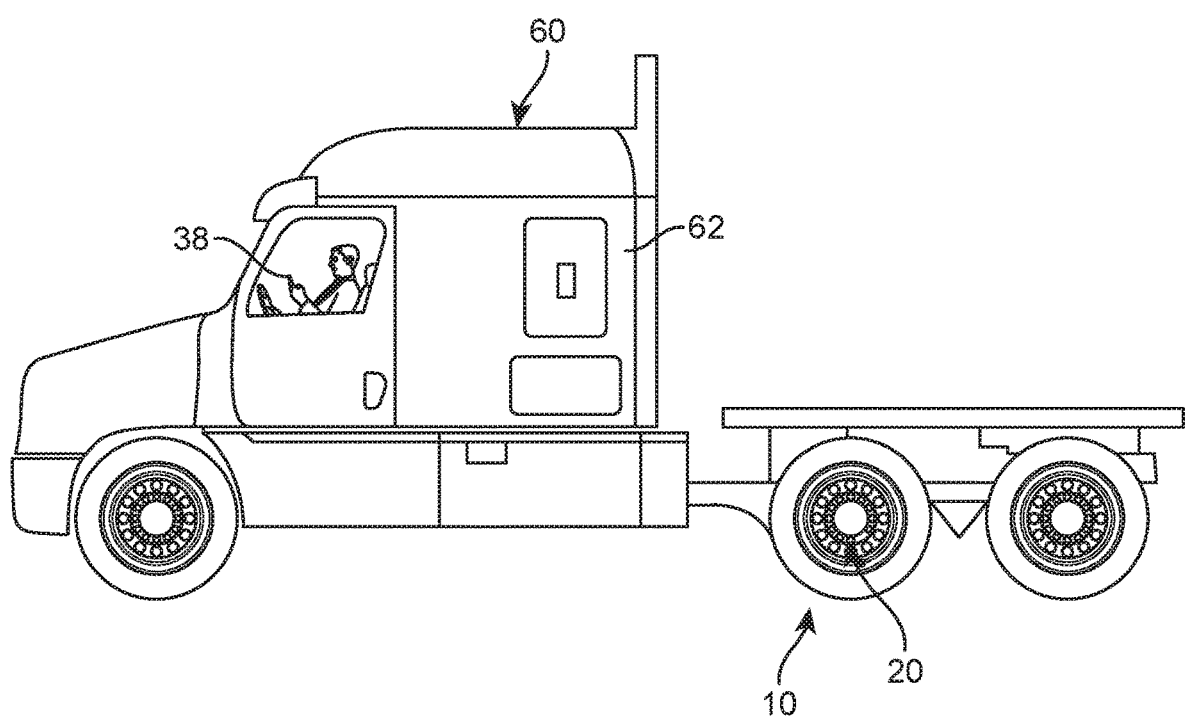
FIG. 1 represents the vehicle wheel accessory 10 in an operational setting mounted to a vehicle hub 64 of a vehicle 62.
Figure 2:
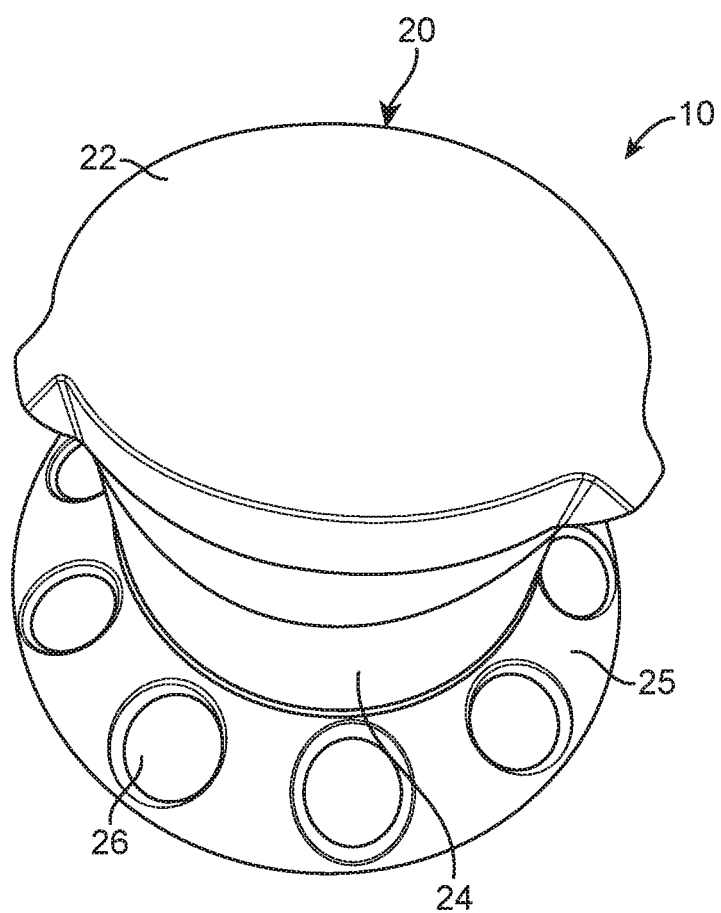
FIG. 2 shows an isometric view of the vehicle wheel accessory 10.
Figure 3:
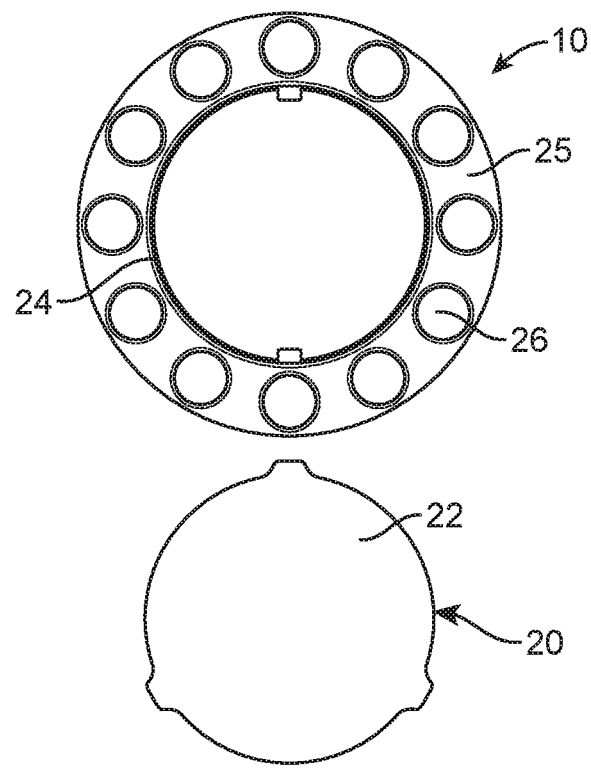
FIG. 3 illustrates the hub cap 22 being separated from the base 24.
Figure 4:
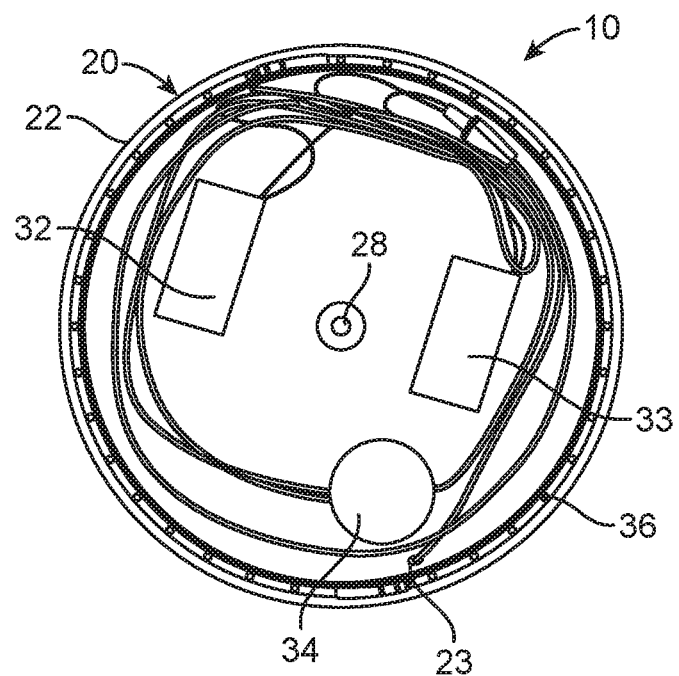
FIG. 4 is a representation of the bottom view of the hub cap 22.
Figure 5:
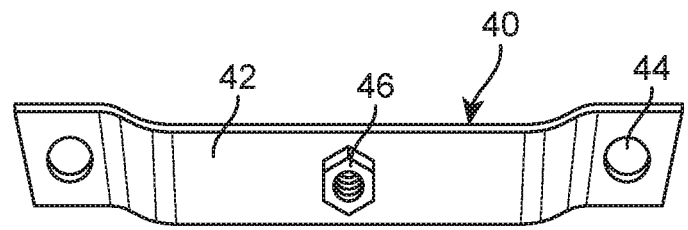
FIG. 5 represents an isometric view of the bracket 42.
Figure 6:
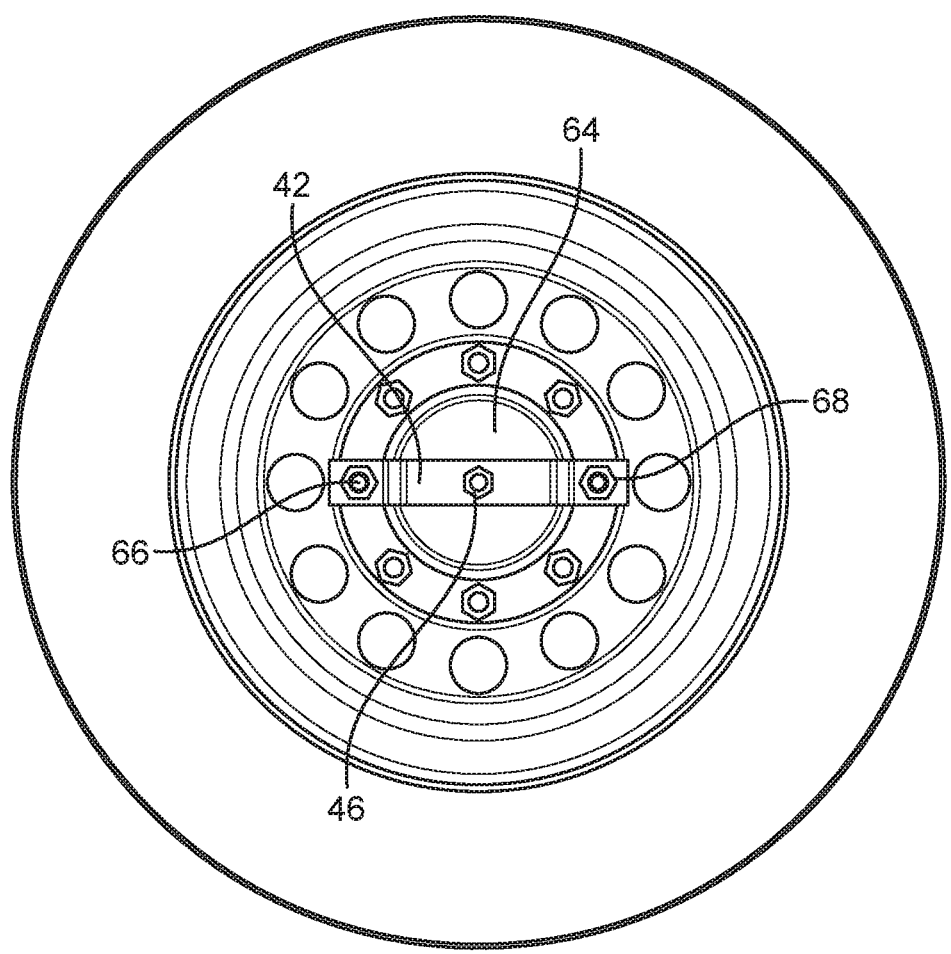
FIG. 6 shows the bracket assembly 40 mounted to the vehicle assembly 60.
Figure 7:
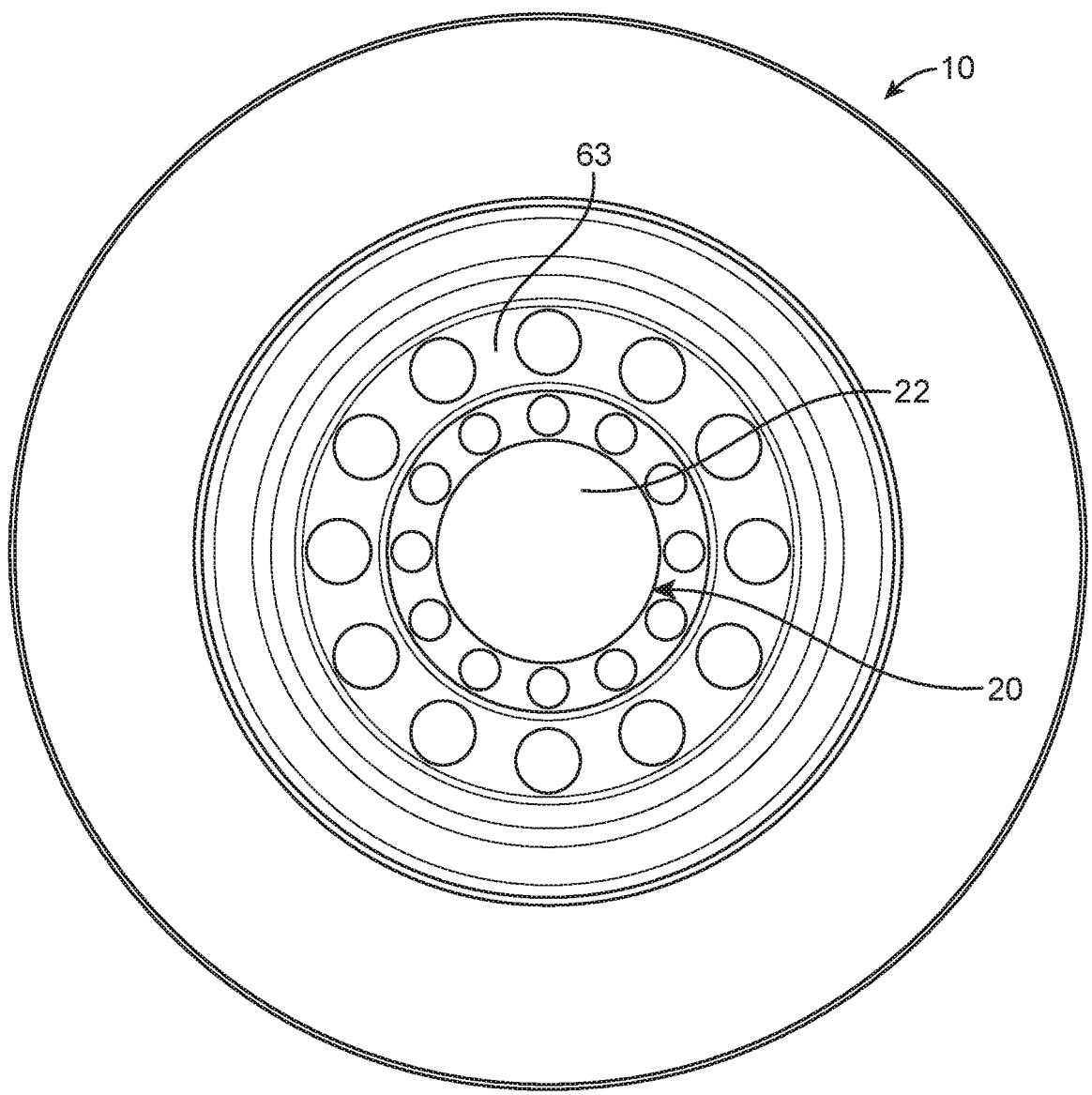
FIG. 7 illustrates a zoomed in view of the hub cap 22 mounted to vehicle 62.

Referring now to the drawings, where the present invention is generally referred to with numeral 10, it can be observed that it, vehicle wheel accessory 10 basically includes a hub cap assembly 20, a bracket assembly 40 and a vehicle assembly 60.

There is often a need for vehicles to include various means of illumination in order to be able to emit light for better viewing of a surrounding area. The ability to illuminate a road and the surrounding area helps to increase the safety of the user. Safety on roads which may be dark, remote, secluded or lonely can help to put the drivers at ease. The present invention further allows the user to improve the looks and aesthetics of their vehicles. The users are able to express their creativity with the ability to customize their vehicles. It is to be understood that vehicles may be one of a car, sedan, truck, trailer, bicycle, motorcycle, van, pick-up truck, 18 wheeler, RV, ATV or other similar vehicles.

The present invention includes hub cap assembly 20, which includes a hub cap 22 mounted to a base 24. Hub cap 22 may, preferably, house all electrical components of the present invention. Hub cap 22 may include a top side and a bottom side. On the top side, hub cap 22 may be domed. It may also be suitable for hub cap 22 to include protrusions about the perimeter of hub cap 22. In one embodiment, hub cap 22 may include three protrusions extending outwardly and away from hub cap 22. On the bottom side of hub cap 22 may be where all electrical components of the present invention are mounted thereto. It may be suitable for hub cap 22 to include an opening 23. Opening 23 may be suitable to use to allow cable or wires to pass through to provide power and connection to the appropriate components as needed. Opening 23 may also include a slit leading to opening 23 to facilitate the securing of cables or wires in opening 23.

Base 24 may be mounted underneath of hub cap 22. It is to be understood, that in one embodiment, it may be suitable to mount hub cap 22 directly to a vehicle 62 without base 24. It is be understood that vehicle 24 may be any one of a car, sedan, truck, trailer, bicycle, motorcycle, van, pick-up truck, 18 wheeler, RV, ATV or other similar vehicles. It may be suitable for hub cap 22 to have a circumference slightly larger than the circumference of base 24. This facilitates mounting and securing of hub cap 22 to base 24. Base 24 may partially extend within said hub cap 24. In an alternate embodiment, hub cap 22 and base 24 may be integral. Base 24 may be substantially cylindrical. Base 24 may include a lip 25 extending about a perimeter of base 24. Lip 25 may be located about a lower portion of base 24. Lip 25 may extend outwardly and away from base 24. Lip 25 may include a plurality of lug nut holes 26 extending about an entire perimeter of lip 25. Lug nut holes 26 may preferably be circular in shape but are not limited to be such a shape. Lug nut holes 26 may be perpendicular to base 24. Base 24 may be hollow to allow receiving a wheel hub 64 of vehicle 62 within base 24. Wheel hub 64 may be centrally located on a vehicle wheel 63. However, wheel hub 64 may also be known as a rim or a wheel of vehicle 62.

Mounted to the bottom side of hub cap 22 may be various components as described below. Centrally mounted to the bottom side of hub cap 22 may be an attaching member 28. Attaching member 28 may preferably be partially threaded at a distal end. Attaching member 28 may be used to mount and secure hub cap 22 to vehicle 62. More specifically, attaching member 28 may secure hub cap 22 to bracket assembly 40. Mounted underneath of hub cap 22 may be centrifugal charging generator 32. It should be understood that centrifugal charging generator 32 may be attached or connected to a battery 33. Battery 33 should be understood to be the power source of the present invention. Battery 33 may be charged by centrifugal generator 32 to maintain power. Centrifugal charging generator 32 may generate or create power upon being rotated or spun for a predetermined length of time. This eliminates the need for recharging the power source manually or any worries of the present invention having enough power to supply as it will always be charged through normal usage of vehicle 62. Centrifugal charging generator 32 is charged with the rotation of vehicles wheels to which the present invention is mounted to. Hub cap assembly 20 may further include a processor 34. Processor 34 may help to control the colors emitted by the present invention. The primary purpose of processor 34 may be to actuate, control, and operate lights 36. Processor 34 may also include a GPS module to determine the location of the present invention. The location of the present invention may be necessary to disable certain colors of lights 36 as certain cities or locations may prohibit vehicles to emit certain colors with lights 36. It is to be understood that centrifugal charging generator 32, processor 34 and lights 36 may be interconnected with cables or wires to allow communication amongst them.

Lights 36 may also be referred to as multicolored LEDs. It may also be suitable for lights 36 to be a light strip. Preferably, lights 36 may be mounted underneath of hub cap 22. Lights 36 may be entirely controlled by the user. Lights 36 may be customized to allow the user to display any color desired. It may be suitable for lights 36 to flash or blink. It may also be suitable for lights 36 to remain steady. Lights 36 may also alternate through various predetermined colors to emit different colors from lights 36. It may be suitable for the user to control the intensity, color, flashing, steadiness, power or other possible controls for lights 36. It may be possible for the user to control lights 36 with a remote control 38. Preferably, remote control 38 may preferably be wireless. With remote control 38, the user may be able to control lights 36 remotely or within vehicle 62. In one embodiment, remote control 38 may be a mobile device. Remote control 38 may communicate with processor 34. It may be suitable for the mobile device or remote control 38 to also include a mobile application to control lights 36. The mobile application may allow for the user to easily and fully customize and control lights 36, even remotely. Lights 36 may also include different predetermined modes with pre-defined settings, which may be controlled by the user.

Hub cap assembly 20 may be mounted onto vehicle 62 with bracket assembly 40. Bracket assembly 40 may include a bracket 42. Bracket 42 may preferably be substantially rectangular in shape, meaning that the width of bracket 42 may be greater than the height of bracket 42. Bracket 42 may include a curvature towards each distal end thereof. Bracket 42 may further include stud openings 44 on each of the distal ends. Stud openings 44 may be adapted to receive wheel studs 66 of wheel hub 64 therethrough. Wheel studs 66 may extend outwardly and away from wheel hub 64. Wheel studs 66 may extend about a perimeter of wheel hub 64. Centrally located on bracket 42 may be an attaching opening 46. In one embodiment, attaching opening 46 may be threaded. Attaching opening 46 may be raised from bracket 42. Attaching opening 46 may be used to receive attaching member 28 within to secure the present invention to vehicle 62. In one embodiment, attaching member 28 may be partially received within said attaching opening 46. Bracket 42 may extend across wheel hub 64 and be secured to any two of wheel studs 66. Bracket 42 may then further be secured to wheel hub 64 with lug nuts 68 which are received by wheel studs 66 and are atop of bracket 42. Bracket 42 is sandwiched between wheel hub 64 and lug nuts 68.

The present invention allows a user to express themselves. Hub assembly 20 is mounted to vehicle 62. Firstly, bracket assembly 40 may be secured to wheel hub 64 of vehicle 62. Bracket 40 is mounted to wheel studs 66 and secured with lug nuts 68. Hub cap 22 may then be mounted to wheel hub 64. Base 24 receives and encloses wheel hub 64. Hub cap 22 may then be secured to bracket 42. The user may then actuate lights 36 in order to illuminate and emit light from the wheels of vehicle 62 during driving. This allows the user to improve the aesthetics of vehicle 62 and further customize vehicle 62 as desired.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A lighting system, comprising:
a) a hub cap assembly including a hub cap having a centrifugal charging generator, a base, a battery, lights and a remote control, said base being hollow and mounted underneath of said hub cap, said centrifugal charging generator connected to said battery to maintain said battery charged, said centrifugal charging generator being rotated to generate power for said battery, said battery mounted to and providing power to said light;
b) a bracket assembly including a bracket; and
c) a vehicle assembly including a vehicle having a vehicle wheel with a wheel hub, wherein the wheel hub is received within and entirely covered by the base, said bracket mounted to said vehicle wheel, said hub cap mounted to said bracket, said lights illuminate said vehicle wheel, said lights being actuated, controlled and customized with said remote control.

2. The system of claim 1, wherein said hub cap includes an opening along a perimeter thereof, said opening adapted to allow cables to connect said battery to said lights.

3. The system of claim 1, wherein said base include a lip at a lower portion of said base, said lip extending about a base perimeter, said lip extending outwardly and away from said base.

4. The system of claim 3, wherein said lip includes lug nut holes extending about said lip, said lug nut holes being perpendicular to said base, said lug nut opening being evenly spaced apart.

5. The system of claim 1, wherein said centrifugal charging generator, said battery, said lights being mounted underneath of said hub cap.

6. The system of claim 1, wherein said hub cap assembly further includes a processor mounted to said lights, said processor controlling the color, intensity, mode, flashing or power of said lights, said processor communicates with said remote control.

7. The system of claim 1, wherein said hub cap further includes an attaching member, said attaching member being centrally mounted underneath said hub cap, said attaching member being threaded and received by said bracket.

8. The system of claim 1, wherein said bracket includes stud openings at distal ends of said bracket, said stud openings being parallel to each other.

9. The system of claim 7, wherein said bracket includes an attaching opening centrally mounted on said bracket, said attaching opening being threaded, said attaching member being partially received within said attaching opening.

10. The system of claim 8, wherein said wheel hub includes wheel studs and lug nuts, said wheel studs extending about a perimeter of said wheel hub, said wheel studs extending away from said wheel hub, said stud openings of said bracket receive said wheel studs therethrough, said bracket said secured to said wheel hub with said lug nuts that attach to said wheel studs, said bracket sandwiched between said wheel hub and said lug nuts.

11. The system of claim 1, wherein said lights are multicolored LEDs.

12. A lighting system, comprising:

a) a hub cap assembly including a hub cap having a centrifugal charging generator, a battery, lights and a remote control, said centrifugal charging generator connected to said battery to maintain said battery charged, said centrifugal charging generator being rotated to generate power for said battery, said battery mounted to and providing power to said lights, a base mounted underneath of said hub cap, said base including a lip extending about a perimeter of said base, said lip mounted to a lower portion of said base, said lip extending outwardly and away from said base, said lip including lug nut hugs evenly spaced apart, said lug nut holes being perpendicular to said base, said base being hollow, said centrifugal charging generator, said battery, and said lights being mounted to an underside of said hub cap, said hub cap assembly further includes a processor mounted to said lights, said processor controlling the color, intensity, mode, flashing or power of said lights, said processor communicates with said remote control, said hub cap further includes an attaching member, said attaching member being centrally mounted underneath said hub cap, said lights are multicolored LEDs;

b) a bracket assembly including a bracket, said bracket including stud openings at distal ends, said stud opening being parallel and opposite of each other, said bracket further including an attaching opening, said attaching opening being centrally located on said bracket, said attaching member being received and secured in said attaching opening; and c) a vehicle assembly including a vehicle having a vehicle wheel with a wheel hub, said bracket mounted to said vehicle wheel, said hub cap mounted to said bracket, said lights illuminate said vehicle wheel, said lights being actuated, controlled and customized with said remote control, said wheel hub includes wheel studs and lug nuts, said wheel studs extending about a perimeter of said wheel hub, said wheel studs extending away from said wheel hub, said stud openings of said bracket receive said wheel studs therethrough, said bracket said secured to said wheel hub with said lug nuts that attach to said wheel studs, said bracket sandwiched between said wheel hub and said lug nuts.

* * * * *